United States Patent [19]

Sato et al.

[11] 3,856,686

[45] Dec. 24, 1974

[54] LUBRICANT CONTAINING THE INORGANIC POLYMERIC GRAPHITE FLUORIDE IN AN IMPROVED DISPERSED STATE THEREOF AND METHOD FOR THE MANUFACTURE OF THE SAME

[75] Inventors: Ken Sato, Yokohama; Kikuo Nakamoto, Kyoto, both of Japan

[73] Assignees: Nippon Carbon Company Limited, Tokyo; Tamotsu Hori, Kyoto, both of, Japan

[22] Filed: Dec. 13, 1971

[21] Appl. No.: 207,652

[30] Foreign Application Priority Data
Dec. 21, 1970   Japan.............................. 45-114910

[52] U.S. Cl......................... 252/30, 252/12, 252/28, 252/29, 252/49.3, 252/49.5
[51] Int. Cl............................................ C10m 3/02
[58] Field of Search ............. 252/12, 25, 28, 29, 30, 252/49.5, 49.3

[56] References Cited
UNITED STATES PATENTS

| | | | |
|---|---|---|---|
| 3,208,823 | 9/1965 | Baker et al. ...................... | 252/28 X |
| 3,262,801 | 7/1966 | Lally et al. ......................... | 252/28 X |
| 3,607,747 | 9/1971 | Ishikawa et al. .................. | 252/12 X |
| 3,654,171 | 4/1972 | Emond et al. ..................... | 252/28 X |

*Primary Examiner*—Patrick P. Garvin
*Assistant Examiner*—Andrew H. Metz
*Attorney, Agent, or Firm*—Stevens, Davis, Miller & Mosher

[57] ABSTRACT

The dispersion of an inorganic high molecular weight graphite fluoride having a formula of $(CF)_n$ in a lubricant is improved by the addition of finely divided silica particles. An improved lubricant composed of base oil, graphite fluoride, and silica has excellent physical and chemical properties hitherto unattainable.

2 Claims, No Drawings

LUBRICANT CONTAINING THE INORGANIC POLYMERIC GRAPHITE FLUORIDE IN AN IMPROVED DISPERSED STATE THEREOF AND METHOD FOR THE MANUFACTURE OF THE SAME

This invention relates to a lubricant containing graphite fluoride in its dispersed state, more particularly, to a novel lubricant containing colloidal silica as a dispersion improver for an improved dispersion of graphite fluoride in a base oil.

The invention is an improvement over U.S. Pat. No. 3,607,747 granted Sept. 21, 1971, assigned to Nippon Carbon Co., Ltd. Tokyo, Japan, entitled "Lubricant Comprising A Novel Lubricating Improver of Inorganic Graphite Fluoride" which is directed to a lubricant composed essentially of grease and graphite fluoride.

In reference to the graphite fluoride, in 1934, Ruff and Bretschneider discovered that graphite and fluorine combined without combustion at about 420° C. to form a grey-colored solid (see Zeitschrift anorg. allgem. Chem.). The approximate composition of this solid was $(CF_x)_n$ where x is nearly equal to 1. They called the compound carbon monofluoride and found that it was hydrophobic and had a high electrical resistance. X-ray diffraction studies indicated that the distance between the carbon-layer planes had been expanded from 3.4A in graphite to about 8A in graphite fluoride. The structure of $(CF_x)_n$ had not been definitely determined, but a structure consisting of covalent bonds between the fluorine and carbon atoms and a tetrahedral arrangement of the carbon bonds has been proposed by Rudorff et al, in "Structure of Carbon Monofluoride" in Z. anorg. Chem., 1947.

The reaction of formation could take place in the temperature range of 420° to 550°C. Varying the temperature resulted in different florine-to-carbon ratios in the compound. The compounds with the highest proportion of fluorine were nearly white in color and almost nonconducting. It is known that carbon and graphite are essentially the same in nature as of carbon, and there are many compounds consisting of carbon and fluorine, such as, carbon tetrafluoride which is colorless liquid, and fluorocarbon polymer, such as, polytetrafluoroethylene which is represented by TEFLON of E.I. du Pont Co. In view of the above, in this invention graphite fluoride is preferred rather than carbon monofluoride.

A recent production of the inorganic high molecular weight graphite fluoride of this invention has been disclosed in U.S. Pat. No. 3,397,087 wherein graphite fluoride is produced by carbon or graphite material with fluorine, halogen fluoride or a mixture thereof or a mixture of these substances with an inert gas or a higher fluorine compound at a temperature of less than 550°C. The configuration is as follows: fluorine is introduced between the layer lattice structure of the graphite or carbon and is chemically bonded with one remaining valence electron in the carbon atom in a covalent bond and the molecular formula may be expressed as $(CF)_n$ and the molar ratio of carbon to fluorine is 1 : 1. The compound is a transparent white solid powder. With respect to the formula $(CF)_n$, in this invention, we adopt $(CF)_n$ wherein the ratio of C to F is 1 : 1.

Graphite fluoride does not soften, nor burn at a relatively high temperature, and is stable up to the temperature of 550°C. under atmospheric pressure. The graphite fluoride has a specific gravity of 2.00 to 2.70, is resistant to corrosion by aggressive chemicals such as acids and alkalis, is heat resistant and has a high electric resistance.

It has been mentioned that graphite fluoride is white, but sometimes it appears grey or black due to the condition of reaction. However, even when only the surface layer of the material is converted into graphite fluoride, it is seen that it has still an inherent peculiar property as similar as that of the white one. Therefore, while the grease containing the grey or black graphite fluoride looks dirty, it can used as well.

U.S. Pat. No. 3,607,747 was granted in view of a discovery that the addition of the inorganic polymer, graphite fluoride, referred above to a lubricating grease would improve the inherent lubricating property thereof considerably, but it has been found that the dispersion of graphite fluoride in the grease is not always satisfactory when it is added to the grease in accordance with the teachings of the above U.S. patent.

After many experimental researches conducted how to improve the dispersion of graphite fluoride in the grease, we have discovered that colloidal silica is a very effective dispersing agent for graphite fluoride. Recently, many additives and improvers for the lubricants have been developed and used in general, such as, viscosity index improvers, oiliness agents, extreme pressure additives, antiwear agents, pour point depressants, cleansers, metal deactivators, anti-oxidants, corrosion inhibitors, rust inhibitors, water repellents, emulsifiers, antifoaming agents, color stabilizers, fluorescence agents, and odor-control agents, etc. Lubricants added with one or more of the additives and improvers referred above are available in the market.

The above lubricants of various descriptions have been and are employed, but there exists no lubricant which meets every requirement. Depending on the requirement of special use, a lubricant having a special additive is employed. However, there is a fact that the lubricant sometimes loses its inherent lubricating property due to a special additive to be added, which gives rise to a new problem to be solved. Referring to one of the problems, a severe frictional heating takes place between two contact faces under the condition of high temperature and high pressure of the boundary friction at the boundary lubrication. In this case, seizure happens due to a local high temperature, therefore an extreme pressure additive must be added to the common lubricant so as to retain its desired lubricating property. However, a chemical reaction occurs between the extreme pressure additive and the surfaces to be lubricated owing to the frictional heat produced between contact surfaces at the boundary lubrication so that the surfaces to be lubricated are softened to increase a frictional wear.

In general, the extreme pressure additive consists of an oilsoluble organic compound containing chlorine, sulfur or phosphorus so that it reacts with the surfaces to be lubricated to cause oxidation or corrosion, and the resulting oxides promote a abrasive action. Further, in order to improve the extreme pressure resistance, a solid lubricant, such as, graphite, $MoS_2$ or $WS_2$ is used as an extreme pressure additive. In reference to graphite, it is seen that its lubricity decreases where there is no adsorptive layer of water on the surface of graphite molecule while there is a disadvantage that it corrodes a metal surface in the presence of moisture.

Molybdenum disulfide or tungsten disulfide is also employed as an extreme pressure additive for use in grease, but its use is limited because it frequently suffers to oxidation or decomposition to produce a corrosive gas or an oxide, a cause of wear.

The use of the powder of an organic polymer, polytetrafluoroethylene as an additive is also known, but it has such disadvantages as: poor thermal conductivity, poor adhesion when coated, poor thermal resistance; and its lubricating property lowers suddenly at about 200°C.

As mentioned above, graphite and molybdenum disulfide have been recommended as inorganic additives adapted for grease, because it is generally imagined that graphite and molybdenum disulfide have the property that they readily adhere to metal and therefore when used as a lubricant, and particularly when they are used as a powder, an excellent lubricating effect can be obtained, and further it has been found that when they are used as a lubricant improver, an enhanced lubricating effect is also attained.

On the other hand, however, graphite fluoride itself does not readily stick to metal so that it shows no better property than molybdenum disulfide when it is used as a powder lubricant. From the results of test conducted on the relation of the pressure and the friction coefficient between molybdenum disulfide powder and graphite fluoride powder by means of Shell type Soda's four ball tester, it is shown that the friction coefficient of molybdenum disulfide is stable in a fairly high extreme pressure, but that of graphite fluoride is not so stable in the broad range of pressure as molybdenum disulfide.

Therefore it has been heretofore considered that molybdenum disulfide is not only the best lubricant but also the best improver, and it has thus been very often used as a grease improver. On the contrary, however, the effect of the addition of graphite fluoride has never been confirmed, nor has graphite fluoride been heretofore used as a powdery lubricant nor as an improver, nor has it been produced commercially as such.

We have studied the effect of the addition of graphite fluoride to grease, and found that it is surprising. It has led to U.S. Pat. No. 3,607,747 as described hereinbefore. Further, we have continued our research with a view to improving the dispersion of graphite fluoride in grease. As a result, we have discovered the effectiveness of the addition of colloidal silica in order to enhance the dispersion of graphite fluoride in grease.

Though graphite fluoride has a good lubricating property, its dispersion in a carrier or solvent is so bad that the excellence of graphite fluoride as an additive for the lubricant has not been fully developed up to now. Based on the assumption that the graphite fluoride will be much more effective for an additive for the lubricant if the dispersion thereof is improved, the requirements for the lubricant containing the additive are listed hereinbelow:

1. A lubricant containing an additive or combined with a carrier containing an additive must be of a good lubricating property.
2. when added, neither oxidation or decomposition takes place.
3. An additive itself must be resistant to chemicals.
4. A lubricant must not damage nor corrode a material to be lubricated.
5. A lubricant must maintain as small a frictional coefficient as possible between two opposed materials to be lubricated.
6. A lubricant must be resistant to a heavy load condition.

It has now been found that all the requirements (1) – (6) listed above are met when a lubricant is added with graphite fluoride to produce an improved lubricant containing it in a well dispersed state, because graphite fluoride has not only a noticeable lubricity but also other remarkable characteristics. Thus, we can provide a novel multipurpose lubricant in accordance with this invention.

However, it has been found that graphite fluoride has a poor dispersibility in a carrier, such as, oil or grease, on account of the following reason: graphite fluoride has no wettability with water since its angle of contact with water is 145°; the angle of contact of polytetrafluyoroethylene with water, on the contrary, is in the range of 100° to 110° which is far less than that of graphite fluoride therefore it is with difficulty dispersed in water. When an organic solvent or synthetic resin is used as a carrier for graphite fluoride, it is seen that graphite fluoride shows wettability while it is precipitated in the solvent or resin owing to the difference of specific gravity. However, the dispersion of graphite fluoride is so poor that its particles coalesce together and it is very hard to produce a good dispersion in the carrier even by a mechanical strong agitation.

Thus, we have discovered after many diverse experiments that (a) a colloidal oxide as a dispersing agent is effective, and (b) it is compatible with graphite fluoride and a carrier, such as, lubricating oils and greases, water, and organic solvents.

The colloidal oxide described in (a) is preferred to be silica (including anhydrous silicia acid), titania or alumina, and its purity is more than 98 percent, preferably more than 99.5 percent, its particle size less than 60 millimicron, preferably less than 20 millimicron in respect to 90 percent of the whole particle size, and its surface area about 100 – 400m$^2$ per gram. The colloidal silica, for example, can be produced by hydrolyzing silicon tetrachloride in a known process. The thus obtained product is an agglomerated form of spherical silica.

The carrier described in (b) is preferred to be one or combination selected from lubricating oils, water, organic solvents, synthetic resins, pastes, and glues. The carriers are listed as follows:

1. Lubricating oils
   a. Mineral oil: napthenic hydrocarbon oil; paraffinic hydrocarbon oil;
   b. Animal and vegetable oils and fats
   c. Synthetic oils: Synthetic hydrocarbon oil; olefinic polymerized oil; alkylated aromatic oil; polyether oil; ester oil; halogenated hydrocarbon oil; silicone oil; and fluorocarbon oil, etc.
   d. Solid and semi-solid lubricants (liquefied by heat). Solid and semi-solid paraffin. Higher alcohols.
   e. Soaps, metallic soaps, and soapless soaps, etc.
2. Water: This water refers to the ordinary industrial one; the higher the purity of water the more preferable, but not be limited thereby.
3. Organic solvents: a. hydrocarbon b. halogenated hydrocarbon c. monohydric alcohol, phenol, and ether d. acid and ester e. polyhydric alcohol and its phenylether f. aldehyde acetal and ketone g. nitrogen compound (nitro, amine, and amide, etc.) h. sulfur compound i. thinner 4. Synthetic resin: phenolic resins; ABS resin; acetal resin; polycarbonate resin; epoxy resin; DVB resin; furan resin; fluorocarbon polymer; polyethylene; silicone; methacrylate resin; polyester resin; vinyl chloride resin; nylon; melamine resin; acrylate resin; synthetic rubber; asphalt; pitch; and tar, etc., etc.

5. Pastes and glues: starch; agar-agar; glue; natural rubber (gutta-percha, and chicle); natural resin (rosin, balsam, and shellac); and protein, etc.

In accordance with a preferred embodiment of the present invention, the lubricant comprises graphite fluoride, silica as a dispersing agent, and a base oil (carrier). The function of each component is described hereinbelow. Graphite fluoride is good in an extreme pressure resistance as well as in lubricity; and colloidal oxide or silica prevents graphite fluoride from sedimentation, activates its surface, and functions the increase of consistency of the lubricant. When the carrier is a lubricating oil, the resulting lubricant works as a cooling agent as well as a lubricating one; when water, it works as a cooling agent, too. When the organic solvent is used as a carrier, it works as a cooling agent; when the synthetic resin, a lubricant; and when the glue, an agent for the increase of consistency. Thus, it is seen that each component develops a particular function of its own. In the lubricant of this invention, however, each component does not work separately or individually, but these components work together with a synergetic action.

When silica is added as a dispersing agent to a carrier containing graphite fluoride, the carrier being selected from the group of lubricating oil, water, organic solvent, and synthetic resin, it is seen that the silica particles are formed into a three-dimensional strong assembly of particles bonded together in a chain configuration by the action of SiOH groups of the silica particle to retain graphite fluoride to disperse it uniformly in the carrier so that a stable dispersion thereof is obtained for an extended period of time while the sedimentation of graphite fluoride is avoided. In this respect, alumina and titania are similar to silica in that they contribute to the formation of the three-dimensional assembly of particles, and they are also effective for dispersing graphite fluoride in the carrier.

In reference to the carrier, lubricating oils, water, organic solvents, synthetic resins, pastes and glues, etc. can be used. They are not only good for the carrier, but they are also readily diluted at the time of use. Further, it is advantageous that a suitable carrier can be selected as desired.

Prior to the use of the lubricant of this invention, the amount of the carrier of the lubricant can be controlled by removing part of the carrier through heating or air-drying.

In accordance with the principle of the invention, graphite fluoride attains its remarkable effect by the addition of 0.0001 – 60 percent by weight based on the carrier in the presence of a colloidal oxide.

We can ascertain the lubricity of a lubricant added with graphite fluoride only to some extent, but, if graphite fluoride only, the amount thereof to be added should not be less than 0.5 percent by weight. If less than 0.5 percent by weight graphite fluoride is added, no effectiveness is perceived. In the lubricant of this invention, however, the amount of as little as 0.0001 percent by weight graphite fluoride can be noticed as effective in the presence of the colloidal oxide as the dispersing agent. The upper limt 60 percent by weight graphite fluoride is established because the benefit of graphite fluoride cannot be expected in view of other components if more than 60 percent is added.

Colloidal oxide functions as a dispersing agent for graphite fluoride in the carrier so as to prevent the sedimentation thereof. The amount of the colloidal oxide to be added is 0.05 to 50 times by weight graphite fluoride, and it should be determined relative to the amount of graphite fluoride in order to make a good dispersion thereof. If less than 0.05 times by weight colloidal oxide is added, or more than 50 times as much as graphite fluoride, it is difficult to make a uniform dispersion of graphite fluoride in the carrier.

In accordance with a preferred embodiment of the invention, the lubricant of this invention is manufactured by the steps as follows: the proportions or percentages of graphite fluoride, colloidal oxide, and carrier are selected within the ranges specified; the lubricant of this invention has many diverse uses, so the carrier should be selected as desired; the carrier should be preferably pretreated in order to disperse graphite fluoride readily therein, and this pretreatment consists of imparting fluidity to the carrier by means of heating or adding a diluting solvent.

Then, the carrier is charged into a closed mixer together with graphite fluoride and colloidal oxide or successively, and they are thoroughly mixed for more than 10 minutes at a reduced pressure. This treatment under the reduced pressure is essential, because the dispersion treatment under a normal or high pressure is useless due to the interference of adsorbed gas of graphite fluoride, the gas making it coagulate and causing sedimentation. It has been found that it is possible to make a good dispersion under less than 720mmHg, preferably from 1 to 50mmHg. A period of time required for mixing under the reduced pressure is preferred to be about 10 minutes. A longer time than a relatively extended period of time, for example, 5 hours, has proved to be useless if taken for mixing. Thus, when the dispersion of graphite fluoride in the carrier in the presence of colloidal oxide is made under the reduced pressure, both graphite fluoride and colloidal oxide are completely suspended in the carrier free from agglomeration and also free from the occlusion of bubbles. As a result, we can obtain the lubricant of a uniform composition having so good lubricity that there is no variation of characteristics therein.

Furthermore, it has been found that a more complete dispersion of graphite fluoride is produced if it is previously dipped in an organic solvent, such as, alcohol and siloxane, etc., to remove the adsorbates on the surface thereof in order to activate it.

The product thus obtained from the above process is subjected subsequently to common finish procedures, such as, adding other substances than the essential components, coloring, concentrating or removing the solvent, heating, forming or molding, and working so as to produce a finished one.

In the manufacture of the finished product, the additives to be added to the lubricant of this invention are described as follows: surface active agent, emulsifier, oiliness agent, extreme pressure agent, corrosion inhibitor, antirust agent, cleanser, pour point depressant, antifoaming agent, antioxidant, and viscosity index improver, etc.

In addition, other substances, such as, fatty acids, pigments (e.g., phthalocyanine), metals (hard and soft particles, and metallic compounds), graphite, molybdenum disulfide, tungsten disulfide, boron nitride, mica, or talc, etc. can be also used as an additive in order to produce a more excellent lubricant having a particular advantage in accordance with the addition of a particular additive thereto.

The lubricant thus produced in accordance with this invention meets all the requirements (1) – (6) listed hereinbefore, so it finds many uses different from the conventional one of the prior art. Further, the present lubricant can be produced in a wide variety of products from a low viscous liquid to a high viscous semisolid paste or wax, then to a hard solid shaped one. Where a particular shaped article is required to be lubricated, it is possible to coat it with the product of this invention. Of course, the product of this invention can be molded under heat or pressure or both in a mold into any shape as desired. Besides, when the graphite fluoride of white color is employed as an additive, the material to be lubricated will be less stained than the use of graphite or molybdenum disulfide.

As described above, the lubricant of the invention finds may diverse uses in a wide variety of forms, which are explained hereinbelow.

1. Application of the present lubricant to machine elements

In addition to the prevention of wear, in general, the lubrication of a machine element requires other many characteristics so that the lubricants consisting essentially of mineral oils are used to meet these requirements. They are as follows: Lubricant for the internal combustion engine of land vehicle (specified by JIS K 2216); lubricant for the marine engine (JIS K 2215; JIS K 2218); spindle oil (JIS K 2210); refrigerator oil (JIS K 2211); dynamo oil (JIS K 2212); Machine oil (JIS K 2214); turbine oil (JIS K 2213); gear oil (JIS K 2219); cylinder oil (JIS K 2217); lubricant for the airplane piston engine (JIS K 2230); cup grease (JIS K 2220); fiber grease (JIS K 2221); graphite grease (JIS K 2222); aluminum grease (JIS K 2223); gear compound (JIS K 2224); grease for the roller bearing (JIS K 2225); grease for the automobile wheel bearing (JIS K 2226); grease for the automobile chassis (JIS K 2227); solid paraffin (JIS K 2335); and fluid paraffin (JIS K 2231), etc.

Note: JIS = Japan Industrial Standard

It is understood that all the conventional lubricants are not always composed of mineral oils merely, but various additives are added in order to show the properties fully and make up for the disadvantages. At present, however, with a remarkable progress of machinery and materials therefor, the lubricants now available in the market cannot meet all the requirements under the severe condition of higher speed and higher load, because there is a line of demarcation over which the modified lubricants added with the improvers of prior art cannot surmount.

Recently, there is a call for a maintenance-free lubricant having a durability for an extended period with no replenishment. The present lubricant comprising 0.01 – 60 percent by weight graphite fluoride, 0.05 – 50 times colloidal silica based on the amount of graphite fluoride, and the carrier oil can maintain the lubricating property for a long period of time. It has been found that the present lubricant added with an additive as desired never loses its inherent property.

A comparison of the known lubricant consisting essentially of a mineral oil added with both the oiliness agent and the extreme pressure agent with the corresponding lubricant of this invention in connection with the property and function was conducted. As a result, it was shown by the present lubricant that neither local heat nor chemical reaction took place at the boundary lubrication, and an effective lubricating film was formed. On the other hand, it was found that the known lubricant reacted with the metal to be lubricated, and the resulting product caused wear and seizure on the friction surface. From this fact, it was perceived that the known lubricant was chemically unstable and the resulting product was in the state of abrading the surface to be lubricated as if it were an abrasive.

2. Application of the present lubricant for metal rolling and working a. Application for metal working In cutting, boring, and grinding, the lubricant serves to absorb the friction heat quickly while avoid a local fusion. The lubricant adapted for the metal should be a low viscosity while absorb heat well, and it is selected depending on the tool, the working condition, and the opposed material to be treated.

To meet the above requirements, the lubricant of this invention comprises water as an essential carrier to remove heat, added with 2 – 6 percent by weight oil, and further, 0.01 – 2 percent by weight graphite fluoride together with the same amount of silica as that of graphite fluoride, and this emulsion type lubricant was used for the metal working. In comparison, it was found that this lubricant was much better than the conventional one in a chemical stability, no growth of bacteria, no discloration, no odor, no separation of oil, no change of pH, anti-rust effect, and working efficiency. Further, it was found that the wear of the tool used was very little, the worked product had a smooth finished surface, and a degreasing treatment after working was readily carried out.

b. Application of the present lubricant for metal rolling

In general, the rolling oil is preferred to be the one to reduce friction and improve the rolling operation while produce a smooth surface with a corrosion resistance so as to remove the scales formed quickly and prevent the rolled sheet from sticking to the working roll. The rolling oil or lubricant of this invention comprises 0.1 – 30 percent by weight graphite fluoride, silica in an amount of one-third to 5 times as much as that of graphite fluoride, and a carrier selected from the group consisting of mineral oil, an aqueous solution of polyethylene glycol, a mixed liquid of fatty oil and polyethylene glycol, and an emulsified carrier containing fatty oil as the base. Thus, the rolling oil is produced which is of an emulsion type or a liquid with a viscosity of about 16 – 60 centistoke (50°C.). This rolling oil proved to be a very good one which does not corrode steel and gives a little friction when it was used for rolling an ordinary carbon steel.

c. Application of the present lubricant for press working

Press oil and drawing oil are used for press forming metal sheet in a die or drawing wire or tubular stock through a die. The press or drawing oil of this invention comprises an organic solvent or soap solution as a carrier for use in dry working, 0.5 – 60 percent by weight graphite fluoride, and silica (or titania or alumina) in an amount as same as that or one-half of graphite fluoride. It proved good. In addition, the press oil for wet working contains a mixture of a high viscosity oil, a low viscosity oil, and soap as a carrier, which proved good, too. Besides, when a soap solution or an emulsion is used as a carrier of the press oil for wet working, it is also good. If the carrier is selected as mentioned above, the press oil can be readily removed by simple washing after working.

3. Application of the present lubricant for apparatuses, machines and the like wherein the inflammable operation is required The machines includes die-casting machines, electric arc welding machines, handling machines for an ingot mold, forging presses, universal presses, various hydraulic machines, hydraulic brakes, and aircrafts, etc. These machines require an incombustible working fluid for the inflammable operation and the working fluid must have an extreme pressure resistance as well as inflammability. To this end, the working fluid in accordance with the principle of the invention comprises a mixture of water and 50 – 60 percent by weight polyethylene glycol, added with 0.1 – 5 percent by weight graphite fluoride and a dispersing agent (e.g., silica) in an amount of 0.5 – 5 times as much as that of graphite fluoride. A comparative test between the above fluid of this invention and the known mineral oil emulsion or polyethylene glycol was conducted. As a result, it was shown that the working fluid of this invention was inflammable and stable at elevated temperatures, and does not corrode seal material and metal. Its shear stability was good. As this working fluid is water-soluble, we can keep it as clean as possible, and it does not freeze at a low temperature, but works well at an extreme pressure. Further, we can select its viscosity index as desired, and it is shown that where this fluid is used the wear of piston and cylinder is very little.

4. Application of the present lubricant for the high temperature lubrication

The known high temperature lubricant is used for various parts, such as, calender rolls for use in kneading plastic or other stock, automatic heat sealing machines, hot air blowers, bearings, particularly for the carriage for use in a continuous kiln for pottery or other ceramic stock, and slides for the movable parts of a charging apparatus of glass melting furnaces or cement kilns. A high temperature lubricant of this invention comprises polyhydric alcohol as a carrier, 0.1 – 20 percent by weight graphite fluoride and a dispersing agent (silica) in an amount of 0.25 – 5 times as much as that of graphite fluoride. This lubricant is thermally stable and has a good high temperature lubricity. As the lubricant has a high viscosity index, it does not produce sludge or carbon, and the lubricating graphite fluoride remains even though the carrier decomposes at high temperatures.

5. Application of the present lubricant for the textile treatment

A lubricant is used for the textile industry, such as, filament spinning, drawing, shrinking, drying, weaving, and other textile treatments. In this treatment, the lubricant comprising polyhydric alcohol (polyethylene glycol, etc.) 0.5 – 100 parts by weight, graphite fluoride 0.05 – 30 parts by weight, and the dispersing agent (silica) from one-twentieth parts by weight based on the amount of graphite fluoride to the equal amount thereof is used in the form of an aqueous solution. As compared with the conventional lubricant consisting of fatty acid, salt solution, or polyhydric alcohol, the lubricant of this invention reduces friction between filaments, and decreases heat as well as resistance resulting from the friction between thread guides or tension rollers of the textile machine so that a high productivity is obtained.

The present lubricant is never decomposed in contact with the acids, such as, sulfuric or acetic acid in the spinning solution or with alkali e.g., caustic soda, and in the high temperature atmosphere during drawing. When the present lubricant is used, no finishing agent, such as, the sulfuric acid ester of a higher alcohol and various emulsions, is required. With no finishing agents, however, it has been perceived that the flexibility, sizing finish, dyeability of the yarn treated by this lubricant are not only improved, but also the end breakage and fluff thereof are avoided, and besides, the yarn is made not to be electrically charged.

6. Application of the present lubricant for the mold release a. A mold lubricant or release agent is used for the pressure mold for shaping an object of various kinds, such as, plastic, glass, sintered alloy, die-casting, grindstone, refractory brick, and carbonaceous material, etc. The lubricant of this invention is used as the mold release agent. The composition of this lubricant depends upon how to coat the mold, for example, spray coating, dip coating, and solid film coating, etc. It has been shown that the more graphite fluoride the lubricant contains the better the mold releases, and the amount of graphite fluoride is preferred to be in the range of 1 – 60 percent.

Particularly, when the present lubricant is used to coat the mold for die-casting an aluminum-base alloy, it is seen that it is better than the conventional one with the result that its life increases two times longer, and further, the finished surface of the die-cast article is very beautiful.

Moreover, when the present lubricant is applied on the mold for pressure shaping a quantity of powder stock, it is shown that a uniform distribution of pressure is effected in the mold, a ready removal of a shaped object therefrom is possible, and besides, the surface of the shaped object is satisfactory with no defect at the corner.

b. For molding a rubber article

The mold lubricant of this invention is made by adding 0.1 – 15 percent by weight graphite fluoride and the dispersant in an amount of 0.33 – 5 times that of graphite fluoride to polyethylene glycol, and then making 7–20 percent aqueous solution. To this aqueous solution, a very small amount of mica, talc, or alkali metal salt of a fatty acid may be added for molding a rubber tire. In particular, this lubricant is effective for lubricating the interior of a rubber hose when it is extruded.

7. Application of the present lubricant in the solid state

To make a solid lubricant in accordance with this invention instead of liquid state, a carrier is selected from the group of synthetic resins, pastes, and glues, to which graphite fluoride and silica (or titania or alumina) are added, and from this composition a shaped object is made in a known manner. From this object we made a bearing and the like which proved to be a wear resistant good lubricating one, because the lubricating characteristics of the bearing surface have hardly any fluctuation owing to a very good dispersion of graphite fluoride.

Furthermore, in view of the above, the solid lubricant article of this invention finds its use in the bearing or slide surfaces of many diverse machine elements, packings, and bearings, etc. Owing to the good dispersion of graphite fluoride and silica in the carrier in accordance with the invention, synthetic rubber, nylon, polytetrafluoroethylene, phenolic resin, and glue, etc. can be used as a carrier so that a slide or bearing surface can be formed from any stock described above as desired. For example, the solid lubricant material of this invention can be used as the oilless bearing.

In general, the bearing material includes: (a) oilless or oil-impregnated bearing: wooden oil-impregnated bearing, plastic oil-impregnated bearing (phenolic, polyamide, and polyacetal resin, etc.), oil-impregnated metal bearing (copper, iron, aluminum, their or sintered alloy, growing cast iron, and porous metal, etc.) (b) non oil-impregnated bearing: plastic bearing (phenolic, polyamide, polyacetal, fluorocarbon polymer, etc.) (c) bearing made of solid lubricant (e.g., molybdenum disulfide, graphite fluoride, and tngsten disulfide, etc.).

The lubricant of this invention can be used for the oilless bearing material described in (a) in such manner that this oilless bearing material is impregnated into its porous body with a composition consisting of an organic solvent (e.g., low-boiling hydrocarbon) as a carrier and 0.1 – 10 percent by weight graphite fluoride and a dispersant in an amount of 0.05 – 2 times that of graphite fluoride. The particle size of graphite fluoride is preferred to be less than 0.5 micron so that the porous body may be readily impregnated with it.

In the manufacture of the bearing impregnated with no oil described in (b), the lubricant composition of this invention can be incorporated into the main material in various known processes. Furthermore, synthetic resins, pastes or glues are used as a carrier into which graphite fluoride and dispersant are incorporated in order to make the solid lubricating bearing described in (c). It is seen that the solidification of the above compositions are known in the art.

This solid lubricant of the invention can be embedded in a recess cut on the surface of a metal bearing in a known manner. It is seen that the surface of this metal bearing is at all times satisfactory by the aid of graphite fluoride contained in the embedded solid lubricant.

8. Application of the present lubricant for the dry lubricating film

In a certain field of industry, a dry film having a good lubricating property has been heretofore required. The dry lubricating film in accordance with the present invention comprises a carrier selected from the group of water, synthetic resin, organic solvent, a mixture of water and oil, a mixture of water and organic solvent, a mixture of water and synthetic resin, a mixture of water and paste (or glue), and a mixture of lubricating oil and organic solvent, 0.1 – 60 percent by weight graphite fluoride, and a dispersant in an amount of 0.05 times to the equal to that of graphite fluoride. Then, an object to be treated is coated, sprayed, or dipped with the liquid lubricant produced by the above process, and then air dried or heated at a temperature higher than the boiling point of the carrier substance to obtain a good lubricating dry film of graphite fluoride. The dry lubricating film thus produced is effective for a machine element where a lubricating oil cannot be used, for example, a slide surface of the fine spinning frame.

9. Application of the present lubricant for special uses a. For the lubrication in the liquid Recently, there are many uses where the lubrication is required in the liquid. In this case the carrier of the present lubricant must be resistant to liquid. Graphite fluoride is neither soluble in the solvent nor melted by heat, and has such properties as lubricating, corrosion resistant, water repellent, and oil repellent. Therefore the present lubricant consisting of graphite fluoride, dispersant, and carrier shows a good lubricating property in the acidic or alkaline liquid, for example, the lubrication of metal sheet or strip in the acid pickling bath, and the parkerizing process wherein surface treatment is performed side by side with a lubricating film coating.

b. Application of the present lubricant for the plating or coating process

As described in the foregoing, the lubricant of this invention has a high resistance to corrosion, so it can be used in the acidic or oxidizing liquid in order to impart to an object therein a lubricating property. On the other hand, molybdenum disulfide, tungsten disulfide, and graphite cannot be used in the acidic or oxidizing liquid because they are decomposed in it. The present lubricant, however, can be used in the plating bath for plating or coating a base metal with a different metal.

A fibrous material, such as, packing and gasket, or a powder metallurigcal product or porous material, or a sintered alloy product can be impregnated with the present lubricant.

c. There is a problem in connection with the contact surface of magnetic recording tape, magnetic table, and magnetic drum because the contact surface tends to wear away. To reduce the wear, the tape, table and drum are coated with a ferrite composition in which the lubricant is dispersed. As a result, it has been shown that the wear of the contact surface can be reduced considerably without imparting an adverse effect to the characteristics of the magnetic tape, table and drum. It is seen that the reverse side coated with the present lubricant of the tape is also wear resistant.

10. Application of the present lubricant for the friction part exposed to the radioactive ray In general, graphite or molybdenum disulfide is used as a lubricant where the part is exposed to the radioactive ray. However, they have disadvantages in that the molecular structure undergoes a change due to the destruction of crystal lattices by neutrons, and molybdenum disulfide increases its friction due to the gamma ray. It has been found that when graphite fluoride is used as a lubricant where exposed to the radioactive ray, it is far less influenced and its lubricating property shows almost no change. For example, the grease consisting of silicone oil and graphite fluoride with the dispersant is preferred to be used in the bearing of the conveyor for the charging apparatus for the atomic fuel of the nuclear reactor.

The present invention will be described in connection with the following examples:

EXAMPLE 1

A: Medium fiber grease made by Daido Yushi K.K.: flag color; consistency 250 ± 20 at 25°C.; dropping point 130°C.

B: Molybdenum disulfide made by Japan Molybdenum K.K.: A powder mean particle size, less than 0.5 micron C: Graphite fluoride made by Nippon Carbon Co., Ltd.: molecular formula $(CF)_n$; mean particle size, less than 10 micron D: Colloidal silica: purity, 99.8 percent; mean particle size, 10 millimicron; surface area, 250 sq.m. per gram From the above substances A, B, C and D, two kinds E and F of the mixture are prepared by mixing and agitating under a slow heating as follows:

E: the above grease A is added with 10 percent by weight B.

F: A is added with 10 percent by weight C.

Then, the lubricant of this invention is produced by adding 7 percent D to the mixture F.

A test was conducted by a standard method by means of the known Soda's four ball tester (Shell type) made by Shinko Zoki K.K., Japan, the details of which are omitted for brevity, and the test method is summarized as follows: a test ball is set, the test grease of this invention is filled in a cup, then a rotary ball is driven, and a load is applied to the rotary ball. The load was gradually increased from zero, and at the rate of 0.5 kg./cm.$^2$ per minute by an oil pressure, then the discontinuous point of friction power was determined as a seizure load. An oil film strength was also determined, and the test condition was as follows:

| | |
|---|---|
| Revolutions of ball: | 200 r.p.m. |
| Test ball, ¾ inch: | High class steel ball for bearing, SUT-2 |
| Load rate: | 0.5 kg./cm.$^2$ per minute. 0 – 20 kg./cm.$^2$ |
| Temperature: | Room temperature |

From this test, it was shown that the limit pressure was determined by means of an oil pressure gauge of the machine as follows:

| Test Sample | Limit Pressure | |
|---|---|---|
| 1. Containing 10% MoS$_2$ | 6.5 | kg./cm.$^2$ |
| 2. This invention, containing 10% (CF)n and 7% silica | 20.0 | do. |

Further, it was found that if part of graphite fluoride was replaced by a known solid lubricant, the effect of adding graphite fluoride was never lost.

EXAMPLE 2

Three fiber greases were taken as test samples: one is the grease A described in Example 1, the second is A added with 3 percent by weight graphite fluoride C, and the last A added with both C (3 percent) and D (3 percent). These three samples were subjected to the test procedure described in Example 1, the results of which are shown hereinbelow:

| Test Sample | Limit Pressure | |
|---|---|---|
| 1. Grease A | 3.0 | kg./cm.$^2$ |
| 2. Containing 3% (CF)n | 6.0 | do. |
| 3. Containing 3% (CF)n and 3% colloidal silica | 20.0 | do. |

EXAMPLE 3

A: Cup grease No. 250 (JIS K 2220) made by Daido Yushi K.K., organge color; consistency 250 ± 15 at 25°C.; dropping point 90°C.

B: Graphite fluoride made by Nippon Carbon Co., Ltd.

C: Colloidal silica

From the above substances, four test samples were prepared and subjected to the test procedure described in Example 1, the results of which are shown:

| Test Sample | Limit Pressure | |
|---|---|---|
| 1. Grease only | 4.5 | kg./cm.$^2$ |
| 2. A + 3% by weight B | 7.5 | do. |
| 3. A + 10% by weight B | 11.0 | do. |
| 4. A + 3% B + 5% C | 20.0 | do. |

EXAMPLE 4

A: A commercially available grease (Japan Trade Mark: HIGH TEMP Grease No. 3); ash 7.2 percent; water content 0; mineral oil 85 percent; flash point of the mineral oil, 276°C.; and viscosity of the mineral oil 31 centistokes at 100°C.

B: Graphite fluoride made by Nippon Carbon Co., Ltd.,

C: Colloidal silica

From the above substances, the following nine test samples were prepared and subjected to a test procedure by a special test machine described hereinbelow.

The special test machine referred above is simple: a cast steel ring directly connected to a motor and a load are provided on the same ordinary carbon steel plate supported on a fulcrum; it is arranged that the ring is driven into revolution by the motor at the peripheral velocity, 5.5 m. per second so as to bring the ring into contact with the plate with the contact area of one sq.cm. The test grease is placed immediately under the steel ring. The load at one end of the plate provides a contact pressure to the ring through the fulcrum to measure the property of the test grease. Just under the contact surface there is provided with a thermocouple which can measure an increase of temperature resulting from the revolution of the ring against the plate. The time of revolution in each test sample is one hour. The results of the above test are shown below wherein the relation between the addition of graphite fluoride with or without the dispersant and the temperature increase due to the sliding contact at PV value, 80 kg/m./cm.$^2$/sec. is indicated, and the friction coefficient at the pressure 15 kg/cm$^2$.

| Test Sample | | Friction Coefficient | Temperature Increase °C. |
| --- | --- | --- | --- |
| 1. Grease A | | 0.134 | 84 |
| 2. A + 0.5% | by weight B | 0.123 | 75 |
| 3. A + 2% | do. | 0.098 | 58 |
| 4. A + 5% | do. | 0.081 | 44 |
| 5. A + 10% | do. | 0.072 | 37 |
| 6. A + 0.5%B + 0.5%C | (this invention) | 0.103 | 36 |
| 7. A + 2%B + 2%C | (do.) | 0.077 | 12 |
| 8. A + 5%B + 5%C | (do.) | 0.065 | 7 |
| 9. A + 10%B + 10%C | (do.) | 0.058 | 5 |

EXAMPLE 5

A: A commercially available fiber grease
B: Molybdenum disulfide
C: Graphite fluoride
D: Colloidal silica Four test samples were prepared from the above substances. As a tester, a gear box of an electric saw (100 V, and 12 ampere) made by PET, which can vary from 5500 to 22000 r.p.m. at the full load, was used, because the gear of this gear box not only evolves a friction heat, but also produces a high heat owing to impact upon the engagement of gears.

The temperature increase of the test grease in the gear box at the full load is shown below:

| Test Sample | Temperature Increase,°C. |
| --- | --- |
| 1. A + 2% by weight C | 100° |
| 2. A + 2%C + 2%D (this invention) | 65° |
| 3. A only | Fluidize prior to the full load |
| 4. A + 2% by weight B | Fluidize at 120° |

EXAMPLE 6

The base oil specified as SAE (Society of Automotive Engineers) No. 30 was divided into three test samples: one is as such, the second added with 2 percent by weight white powdery graphite fluoride, and the third with 2 percent by weight graphite fluoride plus 5 percent by weight silica. These three samples were tested by the four ball friction test specified in JIS K 2517 (four ball load resistance test procedure for the petroleum products) in which the variation of friction coefficient or the friction variation was determined by the variation of the torsion angle, and the results obtained are shown below:

| Test Sample | Load Limit of Tester, oil pressure | |
| --- | --- | --- |
| 1. SAE No. 30 oil | 4.5 | kg./cm.² |
| 2. The oil plus 2% G.F. | 6.5 | do. |
| 3. The oil plus 2% G.F. and 5% colloidal silica | 17.0 | do. |

Note: % by weight and G.F. stands for graphite fluoride

EXAMPLE 7

The gear-box with the reduction ratio 20 : 1 of a 1.5 ton Warner type mixer driven by the three-phase 6-pole alternating current motor (capacity: 60 horsepower) for mixing and kneading a carbonaceons material was supplied with SAE No. 90 gear oil added with 0.5 percent by weight graphite fluoride and 1 percent by weight silica as a lubricant, and the mixer was operated. As a result, it was shown that the wear of the gear and the bearing was so reduced that its durability increased 3 to 5 times longer.

EXAMPLE 8

In the manufacture of a small screw specified in JIS B 1116, a cutting oil specified in JIS K 2241 available in the market, and the same cutting oil added with 1.5 percent by weight graphite fluoride and 1 percent by weight silica were used respectively for comparison. As a result, in the case of the cutting oil (JIS K 2241), seizure took place, and the wear of a super-hard cutting tool made to tungsten carbide was great. On the other hand, when the cutting oil added with graphite fluoride and silica was used, it was found that the wear of the tool was small and its life increased about 27 percent longer. Moreover, the finish precision was enhanced and the work efficiency increased 42 percent.

EXAMPLE 9

In order to determine the performance of a lubricant for use in deep drawing sheet metal, three test samples were prepared as follows:
  A: SAE No. 40 oil
  B: A + 3 percent by weight colloidal silica
  C: A + 2 percent by weight G.F. + 3 percent by weight colloidal silica
  Note: G.F. stands for graphite fluoride The Erichsen type deep drawing test machine specified in JIS B 7777 was used to perform the deep drawing test of sheet by the aid of the above test samples as a lubricant with the condition that the thickness of sheet, 1 mm., the quality of sheet, SPC-1, and the diameter, 70 mm. The results of this test are shown below:

| Lubricant Sample | Drawing Ratio, D/Do |
| --- | --- |
| No lubrication | 0.964 |
| A lubricant | 0.904 |
| B do. | 0.910 |
| C do. (this invention) | 0.806 |

EXAMPLE 10

As described in Example 9, another lubricant samples E,F and G for deep drawing sheet metal were prepared from water as a base carrier as follows:
  E: Water added with 2 percent graphite fluoride.
  F: Water added with 2 percent G.F. and 2 percent colloidal silica
  G: Water added with 2 percent G.F., 2 percent colloidal silica, and 3% water glass
  Note: percent by weight, and G.F. stands for graphite fluoride The test sheet, 0.5 mm. thick, 70 mm. diameter, and quality of sheet SPC - 1, is coated with the above aqueous solutions, respectively, and dried to produce a dry coating, and then subjected to the test procedure described in Example 9, the results of which are shown below:

| Test Sample | Drawing Ratio, D/Do |
| --- | --- |
| No lubrication | 0.914 |
| E lubricant | 0.825 |
| F lubricant (this invention) | 0.650 |
| G lubricant (do.) | 0.681 |

From the above, it is clear that the present lubricant has a very good lubricating property, and another disadvantages that an object to be treated is neither corroded nor damaged. In reference to the sample G, it has been found that in G the adhesion of graphite fluoride to the object to be treated is better than in E and F, and further, its working efficiency is much more improved.

EXAMPLE 11

When various lubricants described below were used at a high temperature between 800° and 1000°C. in the glass melting furnace, such as, in the conveyor of a sheet glass bending machine, the present lubricant of this invention proved to be very effective as shown below:

| Lubricant | Test Results |
| --- | --- |
| 1. Silicone grease available in the market | One month |
| 2. Bentonite grease | Two months |
| 3. This invention: SAE No. 40 oil added with 5% by weight graphite fluoride and 15% by weight colloidal silica | Seven months |

EXAMPLE 12

Eight lubricants were prepared for test samples as shown below. In particular, samples 2, 4, 6 and 8 are made to be 20 percent aqueous solutions, respectively. Eight samples thus obtained were subjected to the test procedure (specified in JIS K 2519 - 1967) by the friction tester made by Shinko Zoki K.K., the results of which are shown below:

| Sample | Composition |
| --- | --- |
| 1 | Polyethylene Glycol (P.E.G.) No. 600 100 parts |
| 2 | 20% aqueous solution of Sample 1 |
| 3 | PEG 100 parts; colloidal silica 7.5 parts |
| 4 | 20% aqueous solution of Sample 3 |
| 5 | PEG 100 parts; graphite fluoride 10 parts |
| 6 | 20% aqueous solution of Sample 5 |
| 7 | PEG 100 parts; graphite fluoride 10 parts; colloidal silica 7.5 parts |
| 8 | 20% aqueous solution of Sample 7; Samples 7 and 8 refer to this invention |

| Sample | Limit Load | Seizure Limit of Torsion Angle | Time elapsed of max. torsion angle | | Wear Trace |
| --- | --- | --- | --- | --- | --- |
| 1 | 3.5 kg. | 12 degree | 2 degree per second | | 0.41 |
| 2 | 1.0 | 3 | 3 do. | 1 do. | 0.36 |
| 3 | 1.5 | 5 | 5 do. | 2 do. | 0.45 |
| 4 | 1.0 | 3 | 3 do. | 0 do. | 0.31 |
| 5 | 9.5 | 31 | 22 do. | 0 do. | 2.07 |
| 6 | 3.0 | 10 | 6 do. | 9 do. | 0.82 |
| 7 | 9.5 | 31 | 31 do. | 6 do. | 1.04 |
| 8 | 5.0 | 17 | 16 do. | 1 do. | 0.88 |

From the above results, it is clearly shown that Sample 1 (polyethylene glycol only) withstands 3.5 kg. of limit load while Sample 5 containing graphite fluoride 9.5 kg. nearly three times as much as that of Sample 1, and Sample 7 containing graphite fluoride and silica withstands the same limit load. In reference to the aqueous solution referred above, the effect thereof is somewhat reduced, but when added with graphite fluoride and colloidal silica, its load limit increased from 3.0 kg. to 5.0 kg. (See Samples 6 and 8 for comparison).

EXAMPLE 13

In order to confirm the effect of the present lubricant of this invention in the textile industry, when the tow of acrylonitrile fiber, 1.5 d × 250,000 D, drawn 6 times longer after spinning is again drawn two times longer at a drawing speed 10 - 20 m. per minute at a temperature of 100° to 140°C. by steam drawing, the filament end breakage is shown as follows:

| Use of Lubricant | Rate of Filament End Breakage |
| --- | --- |
| 1. No use of lubricant | 1/5 |
| 2. Use of water | 1/12 |
| 3. Use of Sample 2 in Example 12 | 1/20 |
| 4. Use of the present lubricant, Sample 8 in Ex. 12 | 1/500 |

EXAMPLE 14

To confirm the effect of the present lubricant of this invention, after spinning the polyacrylonitrile fiber, when the tow of drawn and undried 2.0d × 250,000 D is again shrunk, we obtain the limit of shrinkage percentage where there is no slack as follows:

| Use of Lubricant | Limit of Shrinkage Percentage |
| --- | --- |
| 1. Use of sample 2 in Ex.12 | 20 % |
| 2. Use of Sample 8 (this invention) in Ex. 12 | 30 % |

It is to be noted that the above 30 percent is the maximum shrinkage of the acrylonitrile fiber beyond which this fiber can never be shrunk.

EXAMPLE 15

A filament manufactured by the wet spinning process containing 94 percent polyacrylonitrile was taken as a test sample. After washing, this filament was brought into contact with a heated pin, and drawn in the hot air.

We compared the maximum drawing ratio when the lubricant of this invention was used with that when not used in connection with the time when the filament end breakage happened, we could obtain the values as follows:

|   |   | Maximum Drawing Ratio |
|---|---|---|
| 1. | Lubricant was not used | 1.2 times |
| 2. | The lubricant of Sample 8 in Ex. 12 was used | 4 times |

EXAMPLE 16

A water-cooled plunger (diameter 80 mm., stroke 100 mm., and surface temperature 250° – 280°C.) of the die-casting machine adapted for the molten aluminum alloy was taken as a test sample wherein two lubricants described below were used.

Conventional One: SAE NO. 40 Oil is added with 30 percent by weight colloidal graphite Lubricant of this Invention: SAE No. 40 Oil is added with 5 percent by weight graphite fluoride and 3 percent by weight colloidal silica An amount of wear was measured by using the above two lubricants with the condition: 35 days with 2000 cycles per day; the total 70,000 cycles. The results of test are shown:

|   |   | Wear of Cylinder | Wear of Plunger |
|---|---|---|---|
| 1. | Conventional Lubricant | 0.9 – 1.0mm. | 0.23 – 0.29mm. |
| 2. | Present Lubricant (this invention) | 0.5 – 0.66mm. | 0.08 – 0.09mm. |

An inspection of the products thus obtained was performed, and the rate of defective items was calculated in connection with the surface finish, size accuracy, and crack. The results are shown:

| Conventional Product | 4.81 – 6.42% |
|---|---|
| Product of this Invention | 0.71 – 1.25% |

It is clear from the above results that the life of the plunger in accordance with the invention increased about three times longer, and the rate of defectives of the products could be reduced to less than one-fourth. In particular, the present invention is advantageous in that the color of die-cast products is not stained with black because no graphite is used.

EXAMPLE 17

A thrust collar of push rods of relays of the computor was made of three different samples of plastic material, and these collars were subjected to the lubrication test, the results of which are shown:

|   | Test Sample | Life Cycle |
|---|---|---|
| 1. | Shaped product of nylon 6 | 1 |
| 2. | Nylon 6 containing 5% by weight MoS$_2$ | 4 |
| 3. | Nylon 6 added with 3% by weight graphite fluoride and 2% by weight colloidal silica | 10 |

It is clear from the above that the solid product of this invention is so wear resistant that it has little fluctuation in size accuracy and a very long life.

EXAMPLE 18

A bearing made of a porous sintered copper base alloy is impregnated with 10 percent by weight of each of the two oils specified below:

| 1. | Conventional: | JIS K 2213 No. 140 Oil |
|---|---|---|
| 2. | This invention: | The above oil is added with 3% by weight graphite fluoride and 3% by weight colloidal silica |

The above two bearings are fabricated as a high speed bearing having 4 mm. diameter which is operated with the speed of 10,000 rpm. at the atmosphere temperature of 300°C. The results of test conducted on the two different bearings show that the one impregnated with the oil of this invention has increased its durability about 2.5 times longer.

EXAMPLE 19

Three greases including that of this invention were tested by the ball bearing tester specified in ASTM D 1471-60T under the following condition:

| 1. | Test bearing: | single row radial ball bearing No. 6306, High grade. |
|---|---|---|
| 2. | Test bearing, radial load: | 25 ± 5 lb. (11.34 ± 2.268 kg.) |
| 3. | Test bearing, thrust load: | 40 ± 5 lb. (18.144 ± 2.268 kg.) |
| 4. | Revolution of Main Shaft: | 3500 rpm. |
| 5. | Amount of grease filled: | 6.0 ± 0.1 g. |
| 6. | Test temperature: | 125°C. |
| 7. | Automatic stop temperature: | 135°C. |
| 8. | Total weight of Tester: | 55 kg. |

According to the test results:

|   | Test Grease | Durable Hour |
|---|---|---|
| 1. | Lithium grease | 287.5 hr. |
| 2. | Lithium grease added with 5% by weight graphite fluoride | 501.1 hr. |
| 3 | SAE No. 40 Oil added with 5% weight graphite fluoride and 15% by weight colloidal silica (this invention) | 1120.0 hr |

It is seen from the above that the lubricant of this invention is highly efficient.

EXAMPLE 20

Two greases described below including that of this invention were used for the lubrication test, respectively, in the guard railing portion sliding between the metal base and the nylon canvas of the moving footpath 20 m. long. After the 20-hour continuous run, the temperature increase of the slide portion was shown as follows:

1. No lubrication — 64°C.
2. Paraffin added with 5% by weight MoS$_2$ — 51°C.
3. Paraffin added with 5% by weight graphite fluoride and 2% by weight colloidal silica (this invention) — 35°C.

EXAMPLE 21

In order to ascertain the advantage of the present lubricant of this invention, the following five test samples were prepared from a lubricant as a base carrier for the internal combustion engine of a land vehicle specified in JIS K 2216:

A: Oil specified in the above JIS K 2216
B: A + 5 percent by weight graphite fluoride of less than 1 micron
C: B + 7 percent by weight colloidal silica (dispersant) of 99.8 percent purity and 20 millimicron particle size
D: A + 5 percent by weight MoS$_2$ of 0.7 micron
E: D + 7 percent by weight colloidal silica The above samples were subjected to the standard test procedure by the four ball friction tester described in Example 1, the results of which are shown below:

| Sample | Limit Pressure of Load, kg./cm.$^2$ |
|---|---|
| A | 3.5 |
| B | 7.5 |
| C (this invention) | 20.0 or more |
| D | 4.5 |
| E | 9.0 |

It is clear from the above that the lubricant C of this invention is the best, in the presence of graphite fluoride and colloidal silica.

EXAMPLE 22

An automobile chassis grease (consistency 325, and dropping point 125°C.) is taken as a test sample F to which is added with 2 percent by weight graphite fluoride of less than 10 micron, which is taken as a sample G.

Next, an oil specified in JIS K 2216 is added with 2 percent by weight the above graphite fluoride and 10 percent by weight colloidal silica of 98 percent purity of less than 60 millimicron to prepare its consistency as same as that of the sample F, which is taken as a sample H. These three test samples were subjected to the test procedure by the same friction tester under the same condition described in Example 1, the results of which are shown below:

| Sample | Limit Pressure of Load, kg./cm.$^2$ |
|---|---|
| F | 4.0 |
| G | 12.5 |
| H (this invention) | 20.0 or more |

EXAMPLE 23

In order to compare the lubricating property of the present lubricant of this invention under the most corroding condition, test samples were prepared as shown in Table 1 wherein water is a distilled water, graphite fluoride is less than 3 micron, molybdenum disulfide (MoS$_2$) is the same as described in Example 21, and silicic acid anhydride (silica) is 99.8 percent purity and of 20 millimicron. In reference to the samples K, L, M and N, they were treated in 2N solution of H$_2$SO$_4$ and 2N solution of NaOH at 80°C. for the period of 10 hours, respectively.

The samples were subjected to the same test procedure as described in Example 21, the results of test are shown in Table 1.

TABLE 1

| Sample | Water | G.F. | MoS$_2$ | Colloidal silica | Treatment | L.P.L. |
|---|---|---|---|---|---|---|
| I | 94 | 2 | — | 4 | — | 20.0 more |
| J | do. | — | 2 | 4 | — | 8.0 |
| K | do. | 2 | — | 4 | 2N H$_2$SO$_4$ | 20.0 more |
| L | do. | — | 2 | 4 | do. | 2.0 |
| M | do. | 2 | — | 4 | 2N NaOH | 20.0 more |
| N | do. | — | 2 | 4 | do. | 5.5 |
| O | 96 | — | — | 4 | — | 9.5 |
| P | 98 | 2 | — | — | — | 8.5 |
| Q | do. | — | 2 | — | — | 2.0 |

Note: water, G.F. (graphite fluoride), and MoS$_2$ are % by weight; and L.P.L. is limit pressure of load, kg. per sq.cm. Samples I, K and M refer to this invention.

The kinetic friction coefficients of the samples shown in Table 1 were determined by the standard procedure by means of the T type pendulum friction tester under the condition (steel ball 3/16 inch; pendulum M$_1$ 40 g.; l$_1$ 100 mm.; M$_2$ 80 g. × 2; l$_2$ 340 mm.; initial amplitude 0.5 radian; and the oil temperature of 20°C.), the results of which are

| Sample | Kinetic Friction Coefficient |
|---|---|
| I (this invention) | 0.1322 |
| J | 0.1225 |
| K (this invention) | 0.1345 |
| L | 0.4121 |
| M (this invention) | 0.1612 |
| N | 0.2136 |
| O | 0.2423 |
| P | 0.1992 |
| Q | 0.3241 |

In order to compare the above values with those of the conventional ones, the measured values are obtained below:

| Sample | Kinetic Friction Coefficient |
|---|---|
| 60 spindle oil | 0.2260 |
| 90 turbine oil | 0.2200 |
| 30 engine oil | 0.1840 |
| Distilled Water | 0.4140 |
| Dry Friction | 0.4621 |

EXAMPLE 24

Four test samples R, S, T and U were prepared for the wear test described below as follows:

R: Phenolic resin
S: The sample R + 3 percent by weight graphite fluoride powder, 80 percent by which consists of less than 1 micron.

T: The sample S + 1 percent by weight colloidal silica having 99.8 percent purity and its particle size 20 millimicron as a dispersant.

U: The graphite fluoride of the sample T is replaced by molybdenum disulfide having its mean particle size 0.7 micron.

Above samples were thermoset at 200°C. to make a hard plate, respectively. These plate samples were subjected to the Tabor's friction tester 174 type (ASTM D-1175-64T. D104456. Load 500 g. Grindstone shape CS 10. Dry friction). The amount of wear at the revolution of 20,000 was measured, the results of which are shown below:

| Sample | Wear at 20,000 Revolution | Tabor rate mg/1000 revolution |
| --- | --- | --- |
| R | 1232 mg. | 61.6 |
| S | 474 do. | 23.7 |
| T (this invention) | 225 do. | 11.2 |
| U | 563 do. | 28.1 |

What we claim is:

1. A method of manufacturing a dispersion of graphite fluoride in water, comprising the steps of:

1. dipping said graphite fluoride in an inert organic solvent selected from the group consisting of: alcohol and siloxane, thereby removing impurities on the surface thereof to activate said graphite fluoride;
   2. then adding said graphite fluoride to water in an amount of 0.0001 – 60 percent by weight of graphite fluoride per unit of water;
   3. then adding a colloidal silica powder having a purity of more than 98 percent, a particle size less than 60 millimicrons, with more than 90 percent of said particles being of size less than 20 millimicrons, and having a surface area of 100–400 $m^2/g$, in an amount 1/20 to 50 times by weight of said graphite fluoride to, the graphite fluoride and water; and
   4. mixing and agitating said water, graphite fluoride and colloidal silica powder for a period of at least ten minutes under a reduced pressure of 1-720 mm Hg.

2. The method of claim 1, wherein said mixing and agitating are carried out under a reduced pressure of 1–50 mm Hg.

* * * * *